Figure 1:
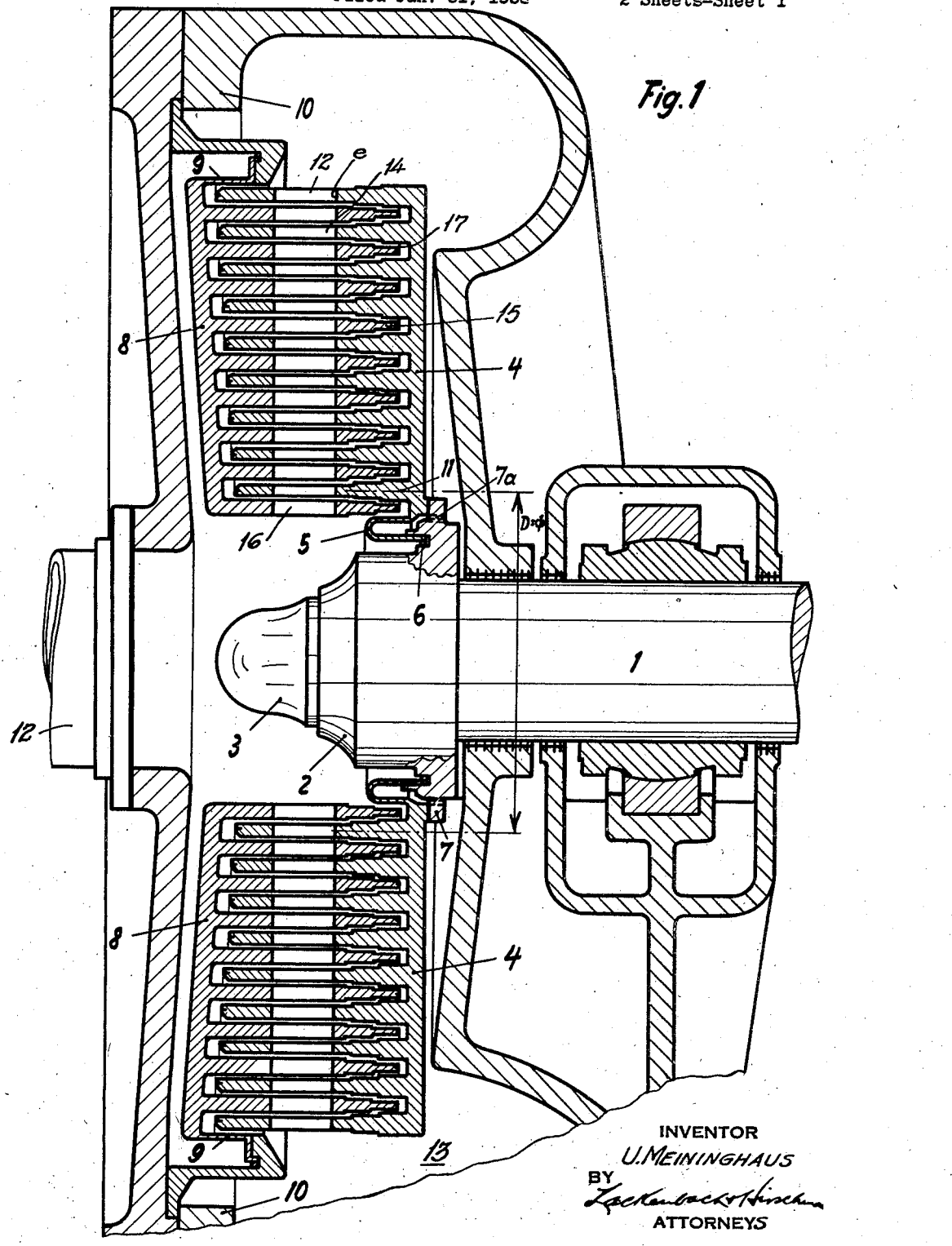

May 14, 1940.     U. MEININGHAUS     2,200,288
BLADED DISK FOR RADIAL FLOW ROTARY MACHINES
Filed Jan. 31, 1938     2 Sheets-Sheet 1

INVENTOR
U. MEININGHAUS
BY
ATTORNEYS

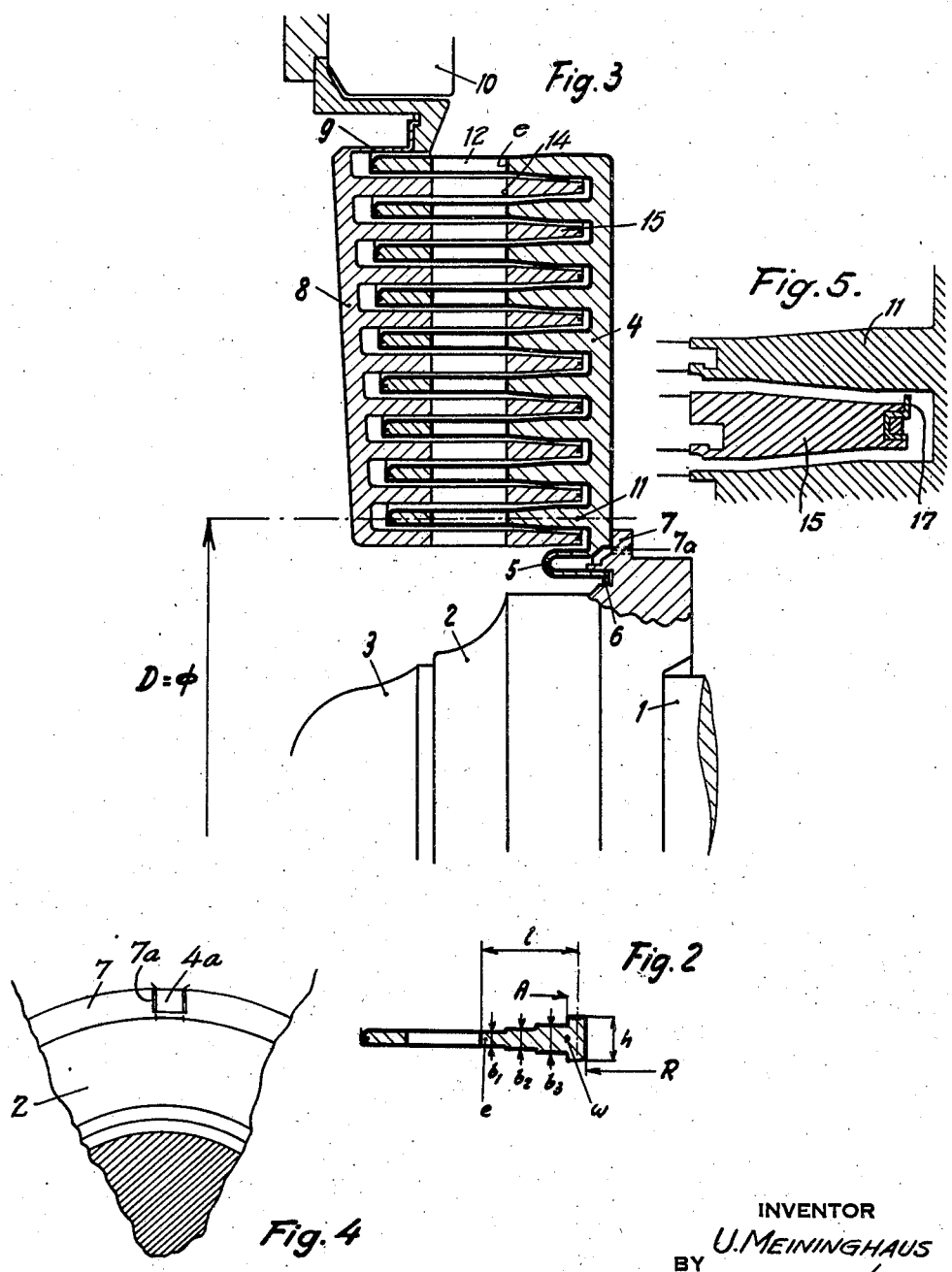

Patented May 14, 1940

2,200,288

UNITED STATES PATENT OFFICE 2,200,288

BLADED DISK FOR RADIAL FLOW ROTARY MACHINES

Ulrich Meininghaus, Mulheim-Ruhr, Germany

Application January 31, 1938, Serial No. 187,961
In Great Britain February 2, 1937

14 Claims. (Cl. 253—79)

The present invention relates to the bladed disk construction of rotary machines, and especially of radial flow steam and gas turbines.

It is the general object of the invention to provide an improved disk for radial flow engines which is capable of withstanding high axial thrusts, and in particular a disk which is specially reinforced in the region where the axial thrust is greatest, and without increasing the axial length of the disk. Other, more specific objects of the invention will appear from the detailed description hereinafter.

The accompanying drawings illustrate by way of example two embodiments of the invention. In said drawings, Figs. 1 and 3 are vertical sections through two forms of bladed disks for a radial flow steam turbine constructed according to the invention. Fig. 2 is a section through the innermost blade ring of the disk shown in Fig. 1; Fig. 4 is a transverse section showing the interlock between the disk and its support for transmitting the torque to the shaft; while Fig. 5 is a detail showing nickel strip packing cooperating with the root portion of a carrier ring.

In Fig. 1 the shaft 1 of a steam turbine carries a hub 2, held in position by a nut 3. The blade disk 4 is connected to the hub by a thin elastic ring 5 which is fixed at 6 into a groove in the hub 2. The rear face of the disk 4 abuts against a collar or shoulder 7 on the hub 2, so that the axial thrust is transferred directly from the disk to the hub without stressing the weak ring 5. In the collar 7 are provided a plurality of recesses 7a in which engage rearward projections 4a on the disk 4, so that the torque is likewise transferred directly from the latter to the hub, the relatively weak ring 5 being thus relieved of the transfer of the tongue. The guide disk 8 cooperating with the disk 4, is fastened in similar fashion by means of an elastic ring 9 to the housing 10.

In those types of radial flow rotary machines in which the driving medium is at different pressures upon the opposite sides of the disk, a differential axial thrust results which tends to cause deformation of the disk. While this deformation may be eliminated or reduced by making the disk sufficiently thick, such thickening is undesirable because it increases temperature stresses, and also packing losses. It has in fact been found highly advantageous to make the disk quite thin and in order to give such a thin disk the requisite strength against axial thrust, it has already been proposed to stiffen the disk with axially extending cylindrical rings 11, which act also as blade carrier rings, formed by grooves cut into the body of the disk down to a certain residual depth of material, these rings carrying on their end surfaces $e$ each a crown of blades 12, the disk being supported on the shaft or on a part fixed to the shaft by means of the flexible supporting member 5, as above described which, under axial thrust or pressure permits the disk to take up an oblique position, the rings thereby becoming deformed. The resistance offered by the rings 11 to deformation under the tangential forces arising from alterations in diameter, results in many cases insufficient strength of the disk to resist the axial thrust or pressure.

Now experience has shown that in the case of most internally supported disks, in particular when they have a small internal diameter, the forces arising in the inner rings 11 as a result of the axial thrust exerted on the disk can reach dangerous values with high differences in pressure of the working medium; since with the usual support of the disks at the inner diameter practically the whole, or substantially the whole of the axial thrust comes to act on the small inner rings as the difference in pressure upon the opposite faces of the disk is greatest at the inner rings (when the disk is supported at the inner rings). In the main there are two forces which can cause overloads in the inner rings, viz.—

(1) The tangential stresses called into play by the twisting or distortion of the rings at the bladed ring ends $e$;

(2) The bending stresses arising on the occurrence of distortion at the ring roots $w$, i. e. at the points of junction between the rings and the disk wall.

With a view to diminishing these forces the present invention proposes that the axial length $l$ of the blade carrying rings 11 at the inner, most strongly distorted rings be made at least as large as half the square root of the product of the mean diameter $D$ of the ring and the radial thickness $b_1$ (see Fig. 2) of the ring at the bladed ring end, while the radial $b_3$ thickness of the ring in the neighborhood of the ring root $w$ is made greater than at the bladed end. It can be demonstrated that when the length of the rings is increased in this way, the tangential stresses developed at the bladed ring ends due to distortion remain smaller than the bending stress at the ring roots, if the influence of the small change in diameter at the root ends under load and also the negligible centrifugal force at the small inner diameters are left out of consideration. The said bending stress is therefore the largest force present. If now by increasing the radial ring thickness near the ring roots the moment of resistance at this place is increased, the diminution of the bending stress at the ring roots so produced means a decrease in the greatest stress called into play by axial thrust and therefore a considerable increase in capacity of the disk to withstand axial thrust.

On the other hand it is possible to increase the radial thickness of the rings near the ring roots without causing any disadvantages, because aside from the points 14 at which the ends of the blades are anchored, the head rings 15 of the guide blades 16, which under working conditions are located between the carrier rings 11 on the rotary disk, can be made substantially thinner than at the ends which support the blades. Even when these head rings do not carry guide blades but counter-running blades, there is no objection to narrowing the head rings at the low peripheral speeds of the inner rings.

The best utilization of material is achieved when, in the case of the inner, most strongly distorted rings, the axial length which is given by dividing the given quantity of material for the ring by the radial ring thickness at the root, which thickness is taken as substantially constant, is approximately as large as half the square root of the product of the mean ring diameter D and the radial ring thickness near the ring roots. The assumption of a uniform ring thickness equal to that at the ring root serves to simplify the calculation. This assumption is sufficiently close to actual conditions to give results sufficiently accurate in practice, whilst the more complicated calculation upon the basis of a variable thickness leads to no results of practical value. The last mentioned relationship, in which the axial length of the ring is to be chosen while taking into consideration the increase of the radial ring thickness at the ring root, leads to approximately equal values of the tangential stress at the bladed ring ends and the bending stress at the ring roots. As the largest values of these stresses occur at the opposite ends of the rings, they have no material influence on one another. The utilization of material is therefore the best imaginable.

As the bending stresses, which occur when the rings become distorted, decrease only slowly from the carrier ring root towards the bladed end of the ring, the radial ring thickness is advantageously increased over at least half the axial length of the ring as compared with the radial thickness at the bladed end. The mechanical manufacturing operations are most favored when the radial ring thickness increases stepwise towards the ring root. The sudden increase in radial thickness from step to step causes, however, a certain notch effect, so that in cases of high loading a continuous increase in radial thickness is preferable. This continuous increase in radial thickness will in general, however, extend at most over only a part of the axial length of the ring, as at times at the bladed end and at the root an end portion of constant thickness is provided to facilitate the fastening of the blades (at the bladed ends of the carrier rings) by the expansion of the material of the blades, and to facilitate also the packing against the nickel strips 17 of the head rings 15 of the guide blades (at the root ends of the carrier rings (see Fig. 5).

The innermost blade ring 11 of the disk 4 is shown separately in Fig. 2. On this ring there act the axial thrust A and the cantilever force R with the lever arm $h$. When calculating the twisting moment acting on the rings, it is usual to neglect the stiffness of the material of the disk portions or webs between adjacent rings, making allowance for this, if desired, by a correction at the end of the calculation. It is for this reason that the distance $h$ is taken as the lever arm of the twisting moment. In this way the bladed end $e$ is so extended that a tangential stress occurs here. The unit bending stresses thereby occurring in the ring 11 would reach their maximum at $w$ (the ring root) if the thickness $b$ of the ring were constant throughout. The unit tangential stress at the bladed end $e$ is in the present case kept smaller than this maximum bending stress would be, by reason of the fact that the axial length $l$ of the ring 11 is $$> \frac{1}{2}\sqrt{b_1.D}$$

where D=mean diameter of the ring 11 (see Fig. 1). The bending stresses on the ring root would therefore, in the case of constant thickness $b$, over the whole length of the ring, constitute the greatest force, neglecting the small influence of any change in diameter at the point $w$ under the load due to axial thrust and centrifugal force. In order to reduce also the bending stress, the radial thickness of the ring 11 is increased towards the root $w$, in steps as shown in Fig. 1 from $b_1$ to $b_2$ and from $b_2$ to $b_3$, which simplifies the manufacture of the disk.

In Fig. 3 the radial thickness of the carrier ring 11 increases continuously over the greater part of its length. This avoids any disadvantageous notch effect which might occur in the stepwise construction. In both cases the utilization of material is most favorable when the axial length $l$ of the ring is about $$\frac{1}{2}\sqrt{b_3.D}$$

as then the highest tangential and highest bending stress are about equal. The increase of radial ring thickness must then extend over at least half of the length of the ring corresponding to the gradual decrease in bending stress towards the bladed end, as shown in the drawings.

The drawings also show clearly how easily by such shaping the space necessary for the thickening of the rings can be gained by corresponding thinning of the carrier rings for the guide blades. Especially at the small inner diameters this thinning of the carrier rings for the guide blades can be easily done, as the inherent stiffness of these small rings is quite sufficient. Centrifugal forces are absent altogether in the guide blading. Only the ends of the carrier rings, which take up the blades, must retain their full thickness to allow of rolling in or anchoring of the blades. At these places, however, the rings of the rotary disk are not thickened. In the drawings, the rings of the rotary disks are shown thickened throughout in the same way to give as uniform a ring construction as possible. As the external diameter of the disks is small, this symmetrical arrangement is advantageous.

It will be noted that the radial flow engine illustrated is of the type in which the driving medium, such as steam under high pressure, is admitted axially as shown at 12 and passes radially outwardly through the interfingering rotor and stator blades, the partially or completely exhausted steam being discharged at 13. It will be obvious that while the pressure through the blades decreases from the region of the shaft to the outermost blading, the pressure upon the opposite face of the rotary disk 4 is of substantially uniform and relatively low pressure. The maximum unit axial thrust therefore occurs, as already explained, in the region of the rings 11 of smallest diameter, i. e., nearest the shaft 1.

Obviously, my invention is not restricted to rotary machines of the specific form illustrated, but may be incorporated in machines having a larger number of rotary disks and operating with different directions of flow of the driving medium.

I claim:

1. A thin walled blade-carrying disk for radial flow rotary machines, in particular steam or gas turbines, having axially extending rings formed by grooves cut into the body of the disk down to a certain residual depth and carrying blades at their outer ends, a shaft, the disk being supported by an elastic member connected with the shaft, thereby permitting the disk to take up an oblique position and the rings to become distorted under the influence of one-sided loads, the inner rings having an axial length which is at least equal to half the square root of the product of the mean ring diameter of said inner rings and the radial thickness of the ring at the bladed end, and the radial ring thickness at the root end being greater than that of the bladed end and a shoulder on the shaft arranged to be engaged by a corresponding surface on the rear of the disk to transmit thrust and torque to said shaft and thereby relieve the said elastic member.

2. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end.

3. A disk according to claim 1, wherein the radial ring thickness is increased over at least half the length of the ring as compared with the thickness at the bladed end.

4. A disk according to claim 1, wherein the radial thickness of the rings increases stepwise towards the root ends.

5. A disk according to claim 1, wherein the radial ring thickness increases continuously over at least a part of the axial length of the ring and toward the root of the ring.

6. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end, the radial ring thickness increasing over at least half the axial length of the ring as compared with the thickness at the bladed end.

7. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end, the radial ring thickness increasing stepwise toward the roots of the blades.

8. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end, the radial ring thickness increasing over at least half the axial length of the ring as compared with the thickness at the bladed end in stepwise fashion.

9. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end, the radial ring thickness increasing continuously over at least half the axial length of the ring as compared with the thickness at the bladed end and toward and to the root end.

10. A disk according to claim 1, wherein the axial length of the inner rings, which is obtained by dividing the given quantity of material for the ring by the radial ring thickness at the root end, which thickness is assumed to be constant, is at least equal to half the square root of the product of the mean ring diameter and the radial ring thickness at the root end, the radial ring thickness increasing continuously over at least a part of the axial length of the ring and toward and to the root end.

11. A thin-walled, blade carrying disk for radial flow rotary machines having axially extending rings carrying blades at their outer ends, the innermost rings increasing in radial thickness toward and to their root ends, a shaft for supporting the disk, and a shoulder on the shaft, said disk having an elastic member for securing the same to the shaft, and having also a surface at the rear thereof arranged axially to engage the shoulder on the shaft to transmit thrust and torque to said shaft and thereby relieve the said elastic member.

12. A disk according to claim 11, wherein the rings increase in thickness in an axial direction from approximately the blade-carrying ends toward and to the root ends thereof.

13. A thin-walled, blade-carrying disk for radial flow rotary machines, a shaft, said disk having axially extending rings carrying blades at their outer ends, the inner rings having an axial length which is at least equal to one-half the square root of the product of the mean ring diameter of said inner rings and the radial thickness of the ring at the bladed end, and the radial ring thickness at the root end being greater than that at the bladed end, said disk having an elastic member for securing the same to the shaft, and a shoulder on the shaft arranged to be engaged by a corresponding surface on the rear of the disk to transmit thrust and torque to said shaft and thereby relieve the said elastic member.

14. A disk according to claim 13, wherein the thickness at the root ends of the successive rings decreases in the direction of the outer diameter of the disk.

ULRICH MEININGHAUS.